United States Patent [19]
Oo et al.

[11] Patent Number: 5,329,455
[45] Date of Patent: Jul. 12, 1994

[54] SPEED CONTROL SYSTEM WITH VARIABLE GAINS RELATED TO SPEED CONTROL

[75] Inventors: Kah S. Oo, Farmington Hills; Gary M. Klingler, Milford, both of Mich.

[73] Assignee: Ford Motor Company, Dearborn, Mich.

[21] Appl. No.: 116,821

[22] Filed: Sep. 3, 1993

Related U.S. Application Data

[63] Continuation of Ser. No. 11,843, Feb. 1, 1993, abandoned, which is a continuation of Ser. No. 743,461, Aug. 9, 1991, abandoned.

[51] Int. Cl.⁵ .................................................. B60K 31/00
[52] U.S. Cl. .................................. 364/426.04; 180/179; 123/352
[58] Field of Search ............... 364/426.04, 431.07; 123/352, 353; 180/170, 176, 179

[56] References Cited

U.S. PATENT DOCUMENTS

| | | | |
|---|---|---|---|
| 3,885,644 | 5/1975 | Seidler et al. | 180/176 |
| 4,094,378 | 6/1978 | Scheyhing et al. | 123/102 |
| 4,098,242 | 7/1978 | Anderson | 123/102 |
| 4,591,986 | 5/1986 | Nakajima et al. | 180/179 |
| 4,803,637 | 2/1989 | Tada et al. | 364/426.04 |
| 4,819,172 | 4/1989 | Takeuchi et al. | 180/179 |
| 4,856,609 | 8/1989 | Naito | 180/179 |
| 4,870,583 | 9/1989 | Takahashi et al. | 364/426.04 |
| 4,893,243 | 1/1990 | Tada et al. | 364/426.04 |
| 4,928,780 | 5/1990 | Tada | 180/179 |
| 5,155,687 | 10/1992 | Katayama | 364/426.04 |

*Primary Examiner*—Gary Chin
*Attorney, Agent, or Firm*—Allan J. Lippa; Roger L. May

[57] ABSTRACT

A speed control system electronically controls the engine throttle to maintain vehicle speed at a reference speed in response to a control signal. The control signal is generated by multiplying a speed error signal by a gain value. Such gain value is provided with a variable amplitude having a first linear relationship to the error signal which is increased to a second linear relationship having greater sensitivity when the error signal exceeds a preselected amplitude.

7 Claims, 15 Drawing Sheets

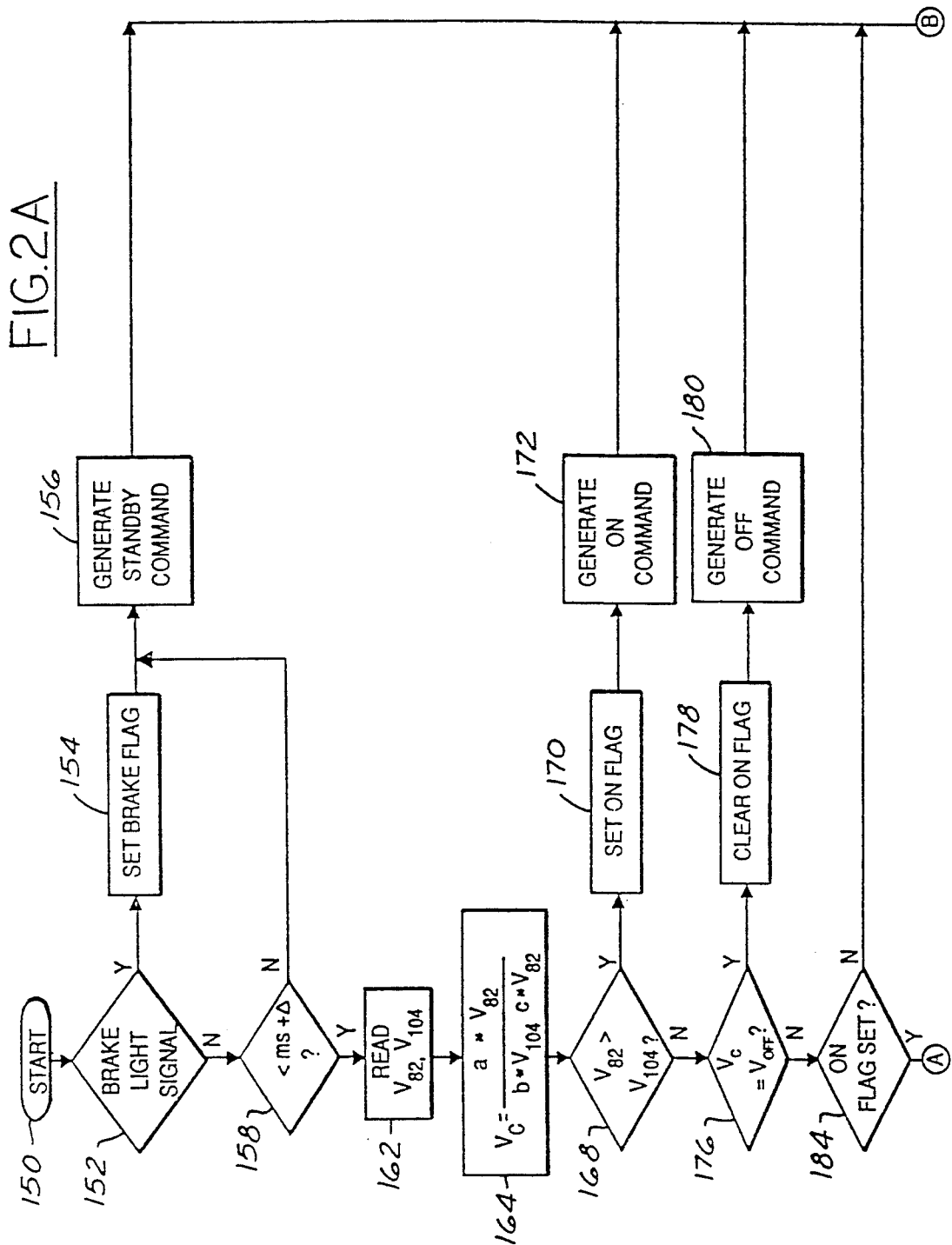

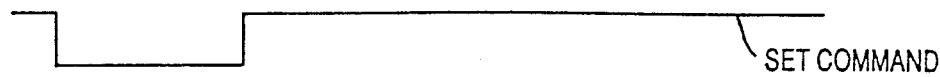
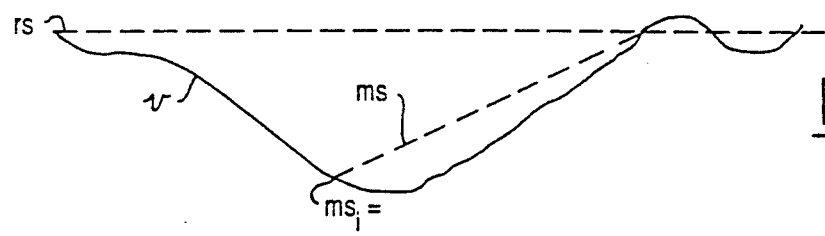
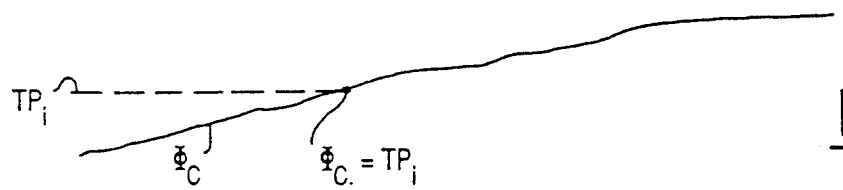
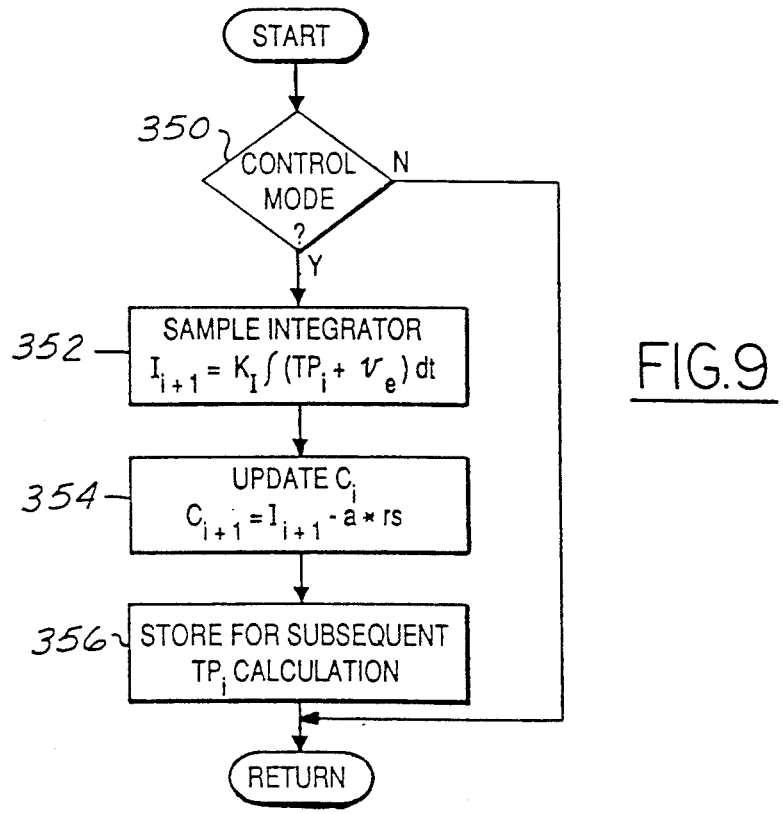

5,329,455

SPEED CONTROL SYSTEM WITH VARIABLE GAINS RELATED TO SPEED CONTROL

This application is a continuation, of application Ser. No. 08/011,843, filed Feb. 1, 1993, now abandoned, which is a continuation of application Ser. No. 07/743,461, filed Aug. 9, 1991, now abandoned.

BACKGROUND OF THE INVENTION

The field of the invention relates to speed control systems for motor vehicles.

Speed control systems are known which control the engine throttle in response to a difference between vehicle speed and a reference speed. Many of such speed control systems amplify this difference signal by a gain constant.

It is also known to adjust the sensitivity of speed control systems to changes in vehicle speed by adjusting the gain constant. For example, U.S. Pat. No. 3,885,644 issued to Seidler et al increases the gain at high speeds to allegedly provide a more psychologically pleasing operator response.

Gains are also adjusted to address certain deficiencies of a particular speed control system. For example, U.S. Pat. No. 4,803,637 issued to Tada et al discloses a diaphragm coupled to the engine throttle and actuated by engine manifold vacuum. During a preset time after speed control operation is initiated, the system gain is increased to rapidly move the diaphragm in an attempt to reduce speed droop which may otherwise occur during speed control initiation.

The inventors herein have recognized various disadvantages of prior approaches. For example, prior speed control systems do not appear to distinguish between operation while cruising over a relatively flat super highway or encountering a sudden gradient. Accordingly, speed control operation may appear to be hunting on flat surfaces, drooping when encountering uphill gradients and overshooting when traveling downhill.

SUMMARY OF THE INVENTION

An object of the invention claimed herein is to provide a speed control system with variable gains related to the speed error such that stable speed control operation is achieved over a wide variation of road conditions.

The above object is achieved, and disadvantages of prior approaches overcome, by providing a speed control system for controlling the engine throttle to maintain vehicle speed at a desired speed. In one particular aspect of the invention, the speed control system comprises: comparison means for generating an error signal by comparing the vehicle speed to the desired speed, correction means for providing a plurality of correction signals each related to the error signal and multiplying each of the correction signals by one of an equal plurality of corresponding gain values, gain providing means for providing each of the variable gain values with a variable amplitude having a first linear relationship to the error signal amplitude, the gain providing means providing the variable gain value with a second linear relationship when the error signal amplitude exceeds a preselected amplitude, summing means for generating a control signal by summing each of the products each correction signal times each corresponding gain value, and actuation means for actuating the engine throttle in relation to the control signal. Preferably, the second linear relationship has greater sensitivity speed error than the first linear relationship.

An advantage of the above aspect of the invention is that low gain values are provided for small speed errors such that speed hunting, which was indicative of some prior approaches, on relatively flat road surfaces is avoided. Another advantage is provided by having gain values with greater gains at higher speed errors, such that more rapid speed control response is provided when encountering a road gradient. Accordingly, speed droop when encountering an uphill gradient is avoided as is speed overshoot when encountering a downhill gradient. Still another advantage is provided of rapidly correcting for road gradients by increasing the linear relationship between gain values and speed error when speed error exceeds a preselected threshold. In addition, different linear relationships are selectable for positive and negative speed errors to specifically compensate for vehicle response. An additional advantage is thereby achieved of compensating for variations in vehicle response which are related to speed error sign.

BRIEF DESCRIPTION OF THE DRAWINGS

The objects and advantages described herein will be more fully understood by reading an example of an embodiment in which the invention is utilized to advantage, referred to herein as the Description of the Preferred Embodiment, with reference to the drawings wherein:

FIGS. 2A-2B are a flowchart showing process steps performed by a microcomputer to generate various speed control commands by decoding a plurality of operator actuable switches shown in FIG. 1;

FIGS. 8A-8C are graphical illustrations of the speed control initialization described with reference to FIGS. 6A-6B;

FIG. 9 is a flowchart of process steps performed by a microcomputer in adaptively learning an initial target throttle position;

DESCRIPTION OF THE PREFERRED EMBODIMENT

Figure 1:
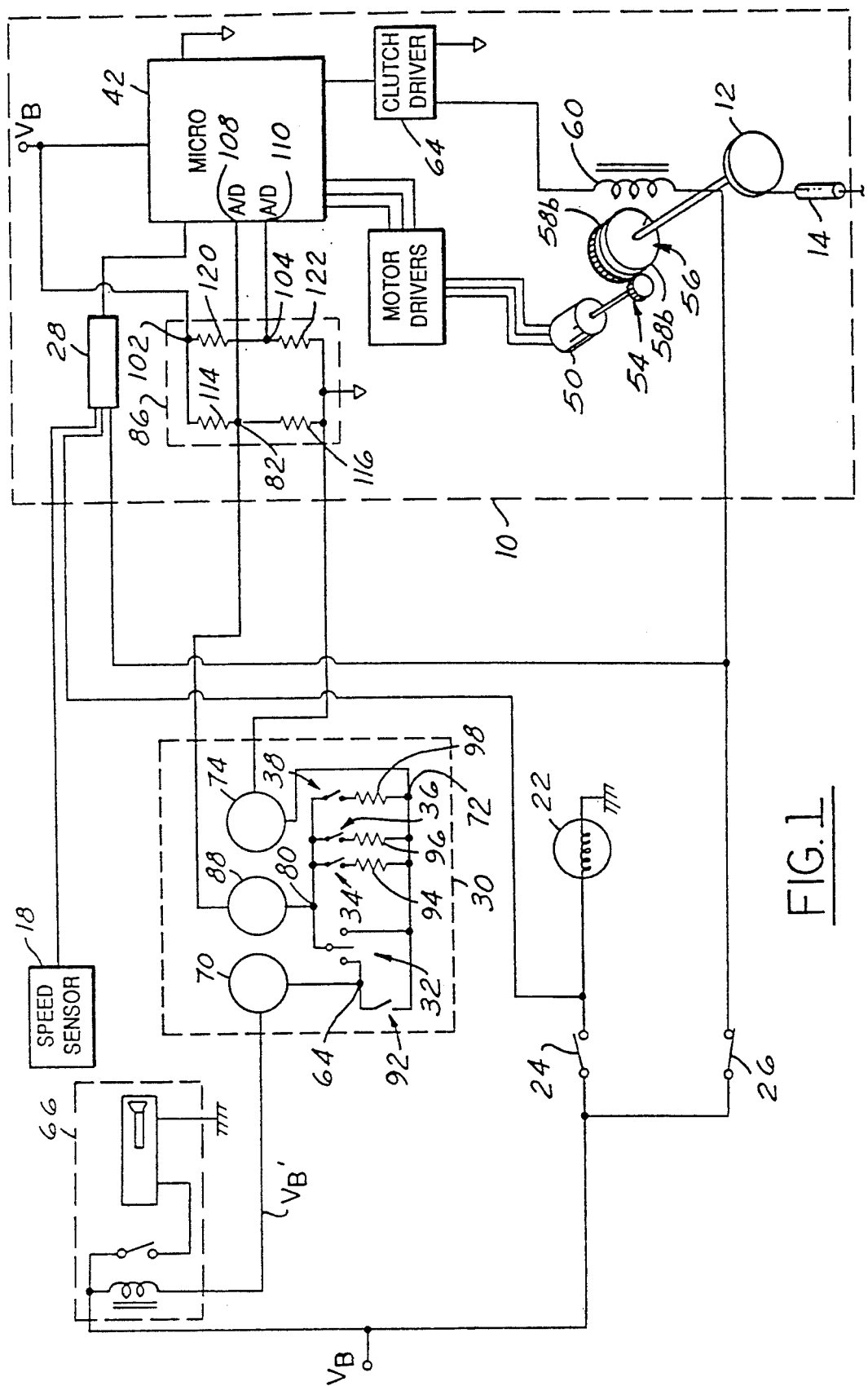
FIG. 1 is an electro-mechanical schematic of a speed control system which utilizes the invention described herein to advantage.

Speed control system 10 is first described in general terms with reference to the block diagram shown in FIG. 1. More detailed description is provided later herein with particular reference to FIGS. 2-16. Speed control system 10 controls the engine throttle (not shown) via cable drum 12, connected to throttle cable 14. In general, speed control system 10 is responsive to: vehicle speed sensor 18 brake light switch 24; and brake dump switch 26 which is responsive to a predetermined hydraulic fluid pressure in the brake line such as, for example, 100 psi. The above inputs are filtered and buffered in a conventional manner by input signal conditioning circuitry 28. In addition, as described in greater detail later herein with particular reference to FIGS. 2A-2B, speed control system 10 is responsive to multiplex switch assembly 30 mounted on the vehicle steering wheel (not shown). In this particular example, multiplex switch assembly 30 includes the following operator actuable momentary switches: ON/OFF switch 32, COAST switch 34, SET/ACCEL switch 36, and RESUME/CANCEL switch 38.

Microcomputer 42, a conventional microcomputer such as the 6805 series, is shown responsive to the above described inputs for controlling stepper motor 50 which in turn controls cable drum 12 via reduction gearing 54 and electromagnetic clutch 56. In this particular example, electromagnetic clutch 56 includes clutch plates 58a and 58b wherein clutch plate 58b is displaced against a return spring (not shown) in response to the flow of electrical current through coil 60.

Continuing with FIG. 1, coil 60 is shown having one end connected to an electrical ground via clutch driver 64, a field effect transistor in this particular example, which is responsive to microcomputer 42. The other end of coil 60 is coupled to battery power $V_B$ via brake dump switch 26. During deactivation of speed control operation, such as when ON/OFF switch 32 is depressed in the OFF position or brake light switch 24 is closed, microcomputer 42 instructs stepper motor 50 to turn to an idle position and thereafter opens electromagnetic clutch 56 via clutch driver 64. In addition, electromagnetic clutch 56 becomes immediately disengaged upon actuation of brake dump switch 26 when a predetermined pressure is achieved in the brake system.

SPEED CONTROL COMMANDS

Figure 2B:
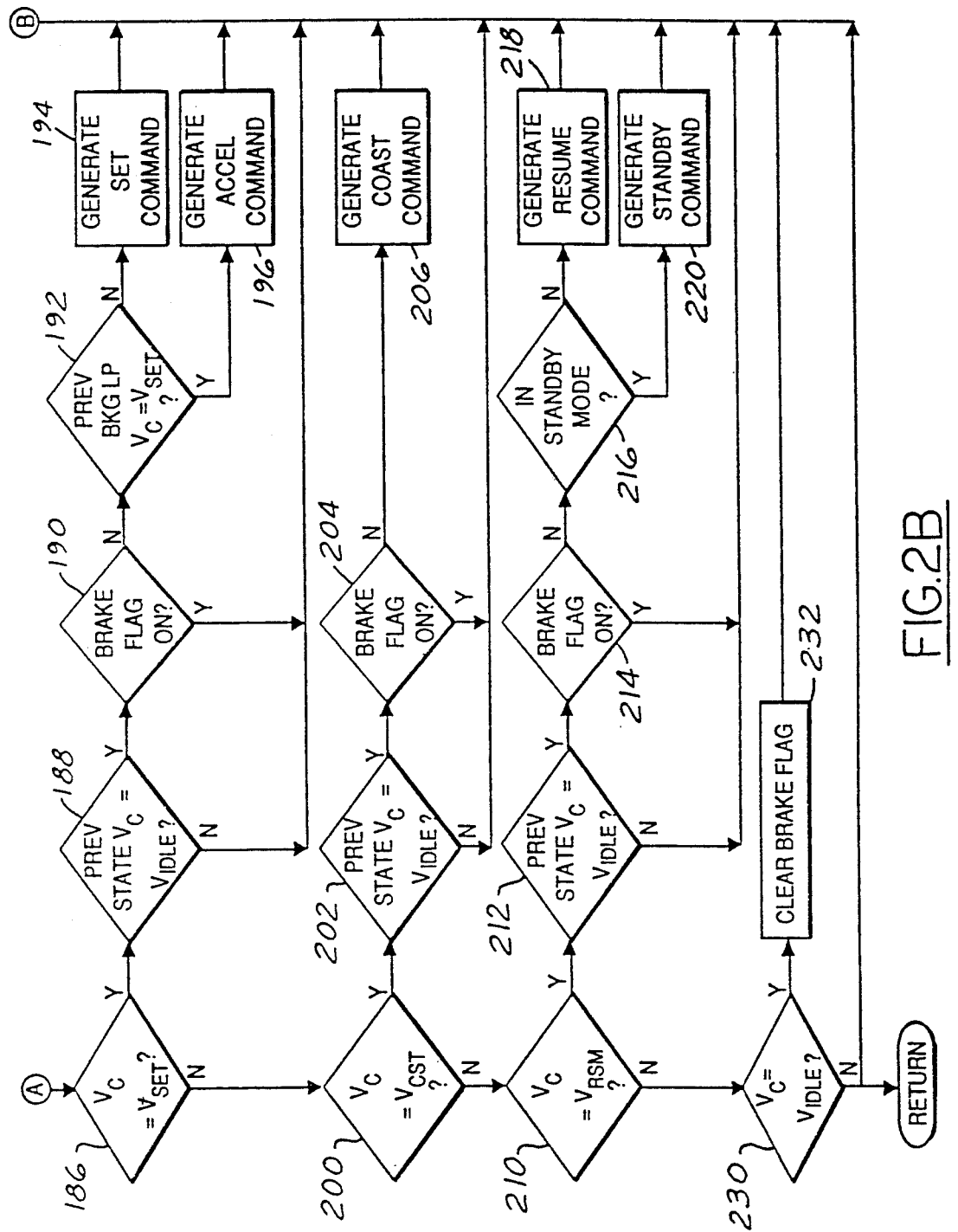

The operation of multiplex switch assembly 30 and decoding of switch actuation by microcomputer 42 to provide corresponding speed control commands (i.e., speed control operating modes), is now described with continuing reference to FIG. 1 and reference to FIGS. 2A-2B. For the particular embodiment shown herein, multiplex switch assembly 30 receives electrical power ($V_B'$) at node 64 via the relay coil of electrical horn assembly 66 through slip ring 70. Electrical ground is shown received at node 72 of multiplex switch assembly 30 via slip ring 74. Switch assembly 30 includes output node 80 which is coupled to node 82 of bridge circuit 86 via slip ring 88. As described in greater detail later herein, a multiplexed output signal or voltage is provided at node 80 by multiplex switch assembly 30. Microcomputer 42 decodes the multiplexed output signal to provide the appropriate command signals. In this particular example, one of five preselected voltages is provided at node 82 ($V_{82}$) by actuation of either momentary switch 32, 34, 36, or 38.

ON/OFF switch 32 is shown as a single pole double throw momentary switch having its pole connected to node 80, its "ON" position connected to node 64, and its "OFF" position connected to electrical ground at node 72. COAST switch 34 is shown as a momentary switch connected in series with resistor 94 between node 80 and node 72. SET/ACCEL switch 36 is shown as a momentary switch connected in series with resistor 96 between node 80 and node 72. RESUME/CANCEL switch 38 is shown as a momentary switch connected in series with resistor 98 between node 80 and node 72. Horn switch 92 is connected in series between nodes 64 and 74.

Electrical bridge 86 is shown including two resistive voltage dividers coupled between electrical ground and node 102 which in turn is coupled to $V_B$. The first voltage divider includes resistor 114 (R114) coupled between node 102 and node 82, and resistor 116 (R116) coupled between electrical ground and node 82. The second resistive voltage divider includes resistor 120 (R120) and resistor 122 (R122) interconnected with node 104. Nodes 82 and 104 are shown connected to respective A/D inputs $A/D_1$ and $A/D_2$ of microcomputer 42.

Operation of multiplex switch assembly 30 and bridge 86 in producing preselected voltages at node 82 corresponding to speed control commands is now described. During actuation of ON/OFF switch 32 to the "ON" mode, voltage $V_B'$ is coupled to node 82. When ON/OFF switch 32 is actuated in the "OFF" mode, electrical ground is coupled to node 82. When all switches of multiplex switch assembly 30 are deactuated (i.e., none are depressed) node 80 is floating such that the voltage at node 82 of electrical bridge 86 is $V_B*R116/(R114+R116)$. That is, the voltage at node 82 is determined by dividing $V_B$ by the first resistive voltage divider including resistors 114 and 116. This voltage is therefore a reference voltage designating the concurrent deactuated or idle position of momentary switches 32, 34, 36 and 38.

During momentary depression of COAST switch 34, resistor 94 is coupled in parallel with resistor 116 of electrical bridge 86. Accordingly, the voltage at node 82 during depression of COAST switch 34 is represented by:

$$V_B* \parallel R116\ R94/(R114+ \parallel R116\ R94):$$

where $\parallel R116\ R94$ represents the resistance of the parallel combination of R116 and R94.

While SET/ACCEL switch 36 is held in the depressed position, resistor 96 is coupled in parallel with resistor 116. During such momentary depression, the voltage at node 82 is represented by:

$V_B^* \parallel R116 \, R96/(R114+ \parallel R116 \, 96)$.

Similarly, during depression of RESUME/CANCEL switch 38, resistor 98 is coupled in parallel with resistor 116. Thus, the voltage at node 82 is then represented by:

$V_B^* \parallel R116 \, R98/(R114+ \parallel R116 \, R98)$.

The voltage at node 104 ($V_{104}$) of bridge 86 is a system reference voltage determined by dividing $V_B$ by the second resistive voltage divider including resistors 120 and 122 (i.e., $V_B*R120/R120+R122$). Any variation in battery voltage, voltage transients or noise on the voltage line will affect both $V_{82}$ and $V_{104}$ in a proportionate manner. As described below with reference to FIGS. 2A-2B, microcomputer 42 scales $V_{82}$ by $V_{104}$ to cancel the effects of voltage variations and noise from $V_{82}$.

The operation of microcomputer 42 in decoding multiplex switch assembly 30, and providing speed control commands is now described with reference to the flowchart shown in FIGS. 2A-2B. Each block shown is representative of process steps performed by microcomputer 42 during each of its background loops. Those skilled in the art will recognize that the process shown may be performed by other components such as analog circuitry or discrete logic components commonly referred to as Integrated Circuits.

At the start of each background loop the brake light signal is sampled in step 152. In the event of a brake light signal, the Brake Flag is set and the STANDBY COMMAND generated (see steps 154 and 156). During the STANDBY mode, stepper motor 50 is phase stepped to an idle throttle position and electromagnetic clutch 56 then opened. Thereafter, resumption of speed control operation occurs with either a SET COMMAND or a RESUME COMMAND.

If the brake light signal is not present, step 158 compares actual vehicle speed (v) to peselected range $\Delta$ around reference speed ms which is stored in memory. When vehicle speed is beyond this preselected range, a STANDBY COMMAND is generated (steps 156 and 158). When vehicle speed is within the preselected range, the digital representation of $V_{82}$ and $V_{104}$ is sampled during step 162. Command signal $V_c$ is then generated digital representation of $V_{82}$ and $V_{104}$ is sampled in step 164 by scaling $V_{82}$ with $V_{104}$ to eliminate the effects of voltage variations and noise at node 82 as previously described herein. Accordingly, command signal $V_c$ is a digital representation or coding of $V_{82}$ which in turn is a voltage representation of switch actuation in multiplex switch assembly 30.

During steps 168, 170 and 172 an ON Flag is set and the ON COMMAND generated when the digital representation of $V_{82}$ is greater than $V_{104}$. Stated another way, speed control operation is enabled when the above comparison indicates that ON/OFF Switch 32 is momentary actuated in the ON position.

Command signal $V_c$ is then compared to a digital representation of the voltage, or voltage range, associated with momentary actuation of ON/OFF switch 32 in the OFF position ($V_{OFF}$) during step 176. If $V_c$ is equal to $V_{OFF}$, the ON Flag is cleared and the OFF COMMAND generated during steps 178 and 180. Stepper motor 50 is then sequenced to an idle position and electromagnetic clutch assembly 56 opened. Speed control operation cannot thereafter be reactuated until an ON COMMAND is received.

When command signal $V_c$ is not equal to signal $V_{OFF}$ and the ON Flag was previously set (see steps 176 and 184), command signal $V_c$ is compared to signal $V_{Set}$ which is a digital representation of the voltage at node 82 during actuation of SET/ACCEL switch 36 (see step 186). If command signal $V_c$ and signal $V_{Set}$ are equal, the previous state of signal $V_c$ is then checked for an idle switch condition ($V_{Idle}$) corresponding to concurrent deactuation of all momentary switches in multiplex switch assembly 30 (see step 188). Should the previous state be other than an idle switch position, two switches may be concurrently actuated by the operator, in which case further speed control processing is exited.

If command signal $V_c$ is equal to $V_{Set}$ (see step 186), and the previous state of command signal $V_c$ was at an idle position (see step 188) indicating that all switches were previously deactuated, then the Brake Flag is checked during step 190. It is noted that the Brake Flag is set during application of the vehicular brakes (see steps 150 and 152) and cleared when command signal $V_c$ is detected at an idle position indicating that all momentary switches were concurrently deactuated (see steps 230 and 232).

Returning to step 190, when the Brake Flag is detected as being cleared, command signal $V_c$ is checked to see if it was also at $V_{Set}$ during the previous background loop. If it was not, then a SET COMMAND is generated (see steps 192 and 194). On the other hand, if command signal $V_c$ was also at $V_{Set}$ during the previous background loop, an ACCEL COMMAND is generated (see steps 192 and 196). Stated another way, detection of continued depression of SET/ACCEL switch 36 results in an ACCEL COMMAND.

As described in greater detail later herein with particular reference to FIG. 3, the SET COMMAND begins initializing speed control operation to achieve the vehicle speed present at the time SET/ACCEL switch 36 is depressed. During continued depression of the switch, speed control system 10 accelerates the vehicle by incrementing the set speed in a preprogrammed manner.

Decoding the actuation of COAST switch 34 occurs during process step 200. After the digital representation of the voltage at node 82 associated with such actuation is detected ($V_{Idle}$), the previous state of command signal $V_c$ is checked in step 202. When a previous idle condition of all switches is detected, and the Brake Flag is in a cleared condition (see step 204), a COAST COMMAND is generated. Otherwise, processing for the particular background loop ceases. During speed control coast operation, stepper motor 50 is turned to idle. Release of COAST switch 34 results in reinitializing speed control operation at the vehicle speed which occurred at the time of such release.

Decoding actuation of RESUME/CANCEL switch 38 and subsequent generation of the RESUME COMMAND begins with step 210. After affirmative comparison of signal $V_c$ with signal $V_{Rsm}$, the previous state of command Signal $V_c$ is checked for an idle condition during step 212. If all switches were previously deactuated and the Brake Flag is in the cleared state (see step 214), the Standby Mode is then checked during (see step 216). If previously in the Standby Mode, the RESUME COMMAND is then generated during step 218. However, if speed control was not previously in the Standby Mode (i.e., speed control in control mode), then depression of RESUME/CANCEL switch 38 is interpreted as a Cancel and the Standby Mode generated (step 220).

During operation in the Resume mode, speed control operation is reinitialized to achieve the desired or set speed which was stored prior to application of the vehicular brakes. A detailed description of Resume operation is described later herein with particular reference to FIGS. 10A-10B, 11A-11C, and 12A-12C.

Continuing with FIGS. 2A-2B, detection of concurrent deactuation of all switches in multiplex switch assembly 30 (i.e., $V_c = V_{Idle}$) during step 230 results in clearing the Brake Flag in step 232. In view of the above described process steps, neither the SET, ACCEL, COAST, or RESUME COMMANDS can be generated unless the Brake Flag is cleared. Stated another way, these commands cannot be generated until each switch of multiplex switch assembly 30 is concurrently at an idle position. Further, each previous state of signal $V_c$ must be at an idle position (see steps 188, 202 and 212). Accordingly, speed control operation is prevented when any of the switches remains in an actuated position such as when the vehicular operator inadvertently holds down a momentary switch or concurrently actuates two switches. However, once such switch returns to normal operation, speed control processing will then continue.

CONTROL MODE

Figure 3:
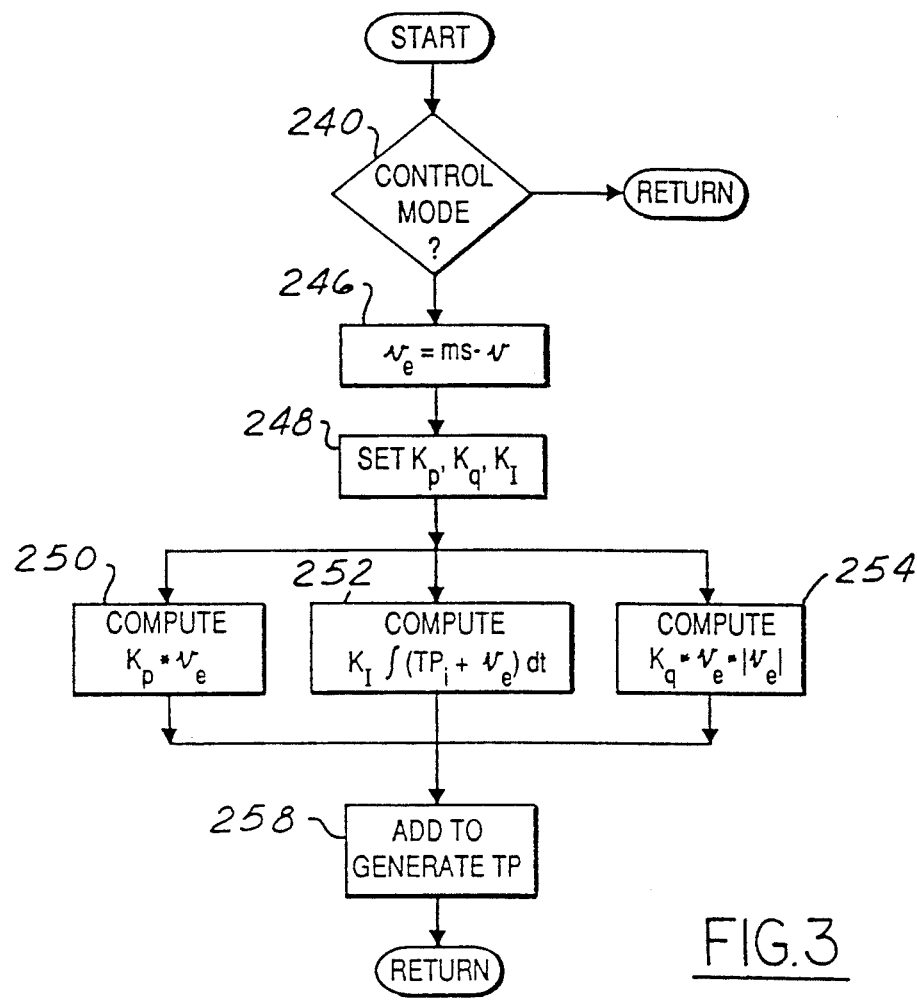
FIG. 3 is a flowchart showing process steps performed by a microcomputer to generate a throttle position command during speed control operations.
Figure 4:
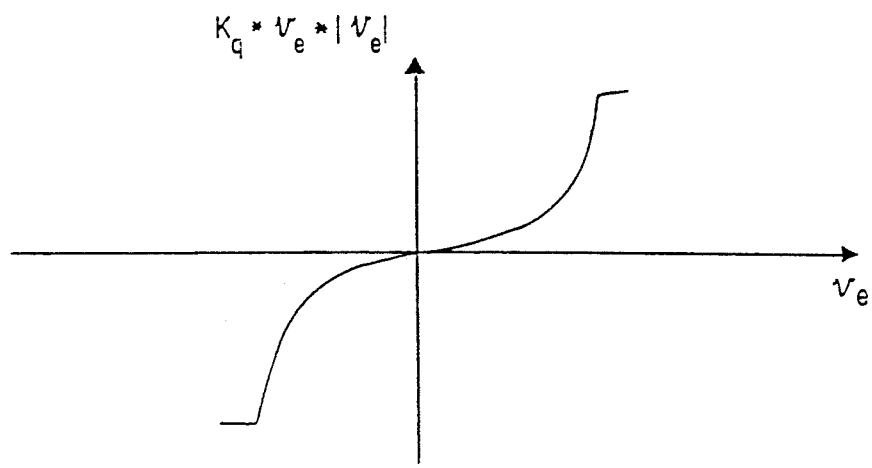
FIG. 4 is a graphical illustration of quadratic speed control operation.

Referring now to FIGS. 3 and 4, the Control Mode, or steady-state, speed control operation is now described. The Control Mode is entered after initializing operations during the Set, ACCEL, or Resume Mode, as described in greater detail later herein. During the Control Mode, feedback speed control operations maintain the vehicle at the set or desired speed. Upon recognition of the control mode in step 240 speed error signal $v_e$ is computed in step 246 by subtracting actual vehicle speed v from reference speed ms which is stored in memory location m. Gain constants $k_p$ (proportional term), $k_q$ (quadratic term), and $k_I$ (integral term) are set in step 248 as a function of vehicle speed. In this particular example, each gain constant is one of three values each associated with one of three speed ranges. These speed ranges are designated as a high speed range ($v_h$), a medium speed range ($v_m$), and a low speed range ($v_l$).

During process steps 250-254, proportional, quadratic, and integral speed control are derived from error speed signal $v_e$. In process step 250 the proportional speed control term is provided by multiplying proportional gain constant $k_p$ times speed error signal $v_e$. This proportional term provides relatively fast speed control response to a speed error.

The integral control term is computed in step 252 by integrating speed error signal $v_e$, multiplying this integral by integral term $k_I$, and adding an initial throttle position designated as $TP_i$. The computation of initial throttle position $TP_i$ is described later herein with particular reference to FIG. 6. This integral control term provides speed control system 10 with stable steady-state operation.

As shown in process step 254, the quadratic speed control term is calculated by multiplying quadratic constant $k_q$ times the product of error signal $v_e$ and the absolute value of error signal $v_e$. This particular multiplication is used to advantage for generating a quadratic control term having the sign of error signal $v_e$. The quadratic, integral, and proportional control terms are then added in step 258 to generate throttle position command signal TP. As described later herein with particular reference to FIG. 5, throttle position command signal TP causes stepper motor 50 to turn to the commanded throttle position.

Referring now to FIG. 4, the advantages of the quadratic control term are described. Quadratic control term $k_q e^* v_e^* |v_e|$ is plotted as a function of speed error signal $v_e$. It is noted that at low speed error signals (such as $v_e$ less than 1 mph), the quadratic control term is relatively small due to its squaring feature. On the other hand, the quadratic control term contributes substantially at higher speed error signals. To prevent excessive contribution at high speed error signals, the quadratic control term is clipped or limited at predetermine positive and negative limits. An advantage of the quadratic control term utilized herein is that small speed error signals are essentially ignored thereby providing a more stable speed control system. On the other hand, large corrections are quickly provided for significant speed errors thereby achieving a speed control system with a relatively fast response time.

Figure 5:
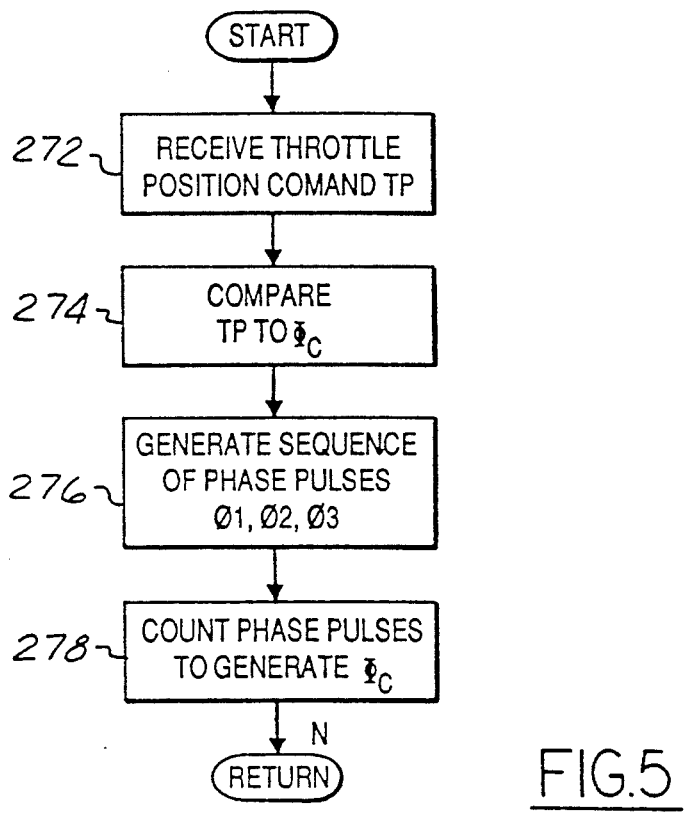
FIG. 5 is a flowchart showing process steps performed by a microcomputer in controlling a stepper motor coupled to the engine throttle in response to a throttle position command.

Referring now to FIG. 5, a block diagram showing the process steps for phase control of three-phase stepper motor 50 is now described. During step 272 throttle position command TP is provided in a manner described later herein with particular reference to FIG. 4. In step 274 throttle position command TP is compared to total phase count $\Phi_c$ which, as described below, infers the actual position of stepper motor 50 and accordingly the throttle plate (not shown). The difference between throttle position TP and phase count $\Phi_c$ is representative of the angular position which stepper motor 50 must be incremented or decremented to in order to achieve the throttle position commanded by microcomputer 42. In response, a sequence of phase pulses ($\Phi_1$, $\Phi_2$, and $\Phi_3$) is generated during step 276 for turning stepper motor 50 to throttle position TP. As phase pulses $\Phi_1$, $\Phi_2$, and $\Phi_3$ are generated for turning stepper motor 50 in discrete phase steps, each pulse is counted to provide a total phase count $\Phi_c$ in step 278 which is related to the actual position of stepper motor 50. The above described process then continues the next background loop of microcomputer 42 when a new throttle position command is received.

SET MODE

Figure 7:
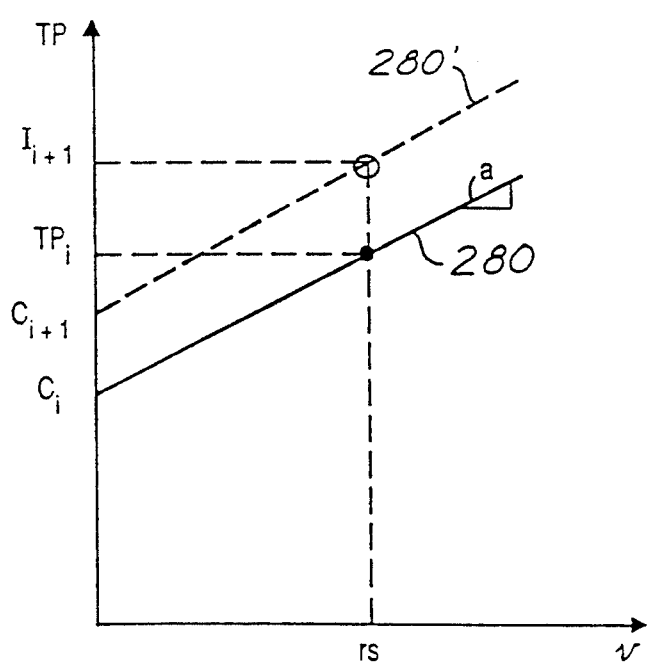
FIG. 7 is a graphical illustration of generating an initial throttle position for initializing speed control operation.
Figure 6A:
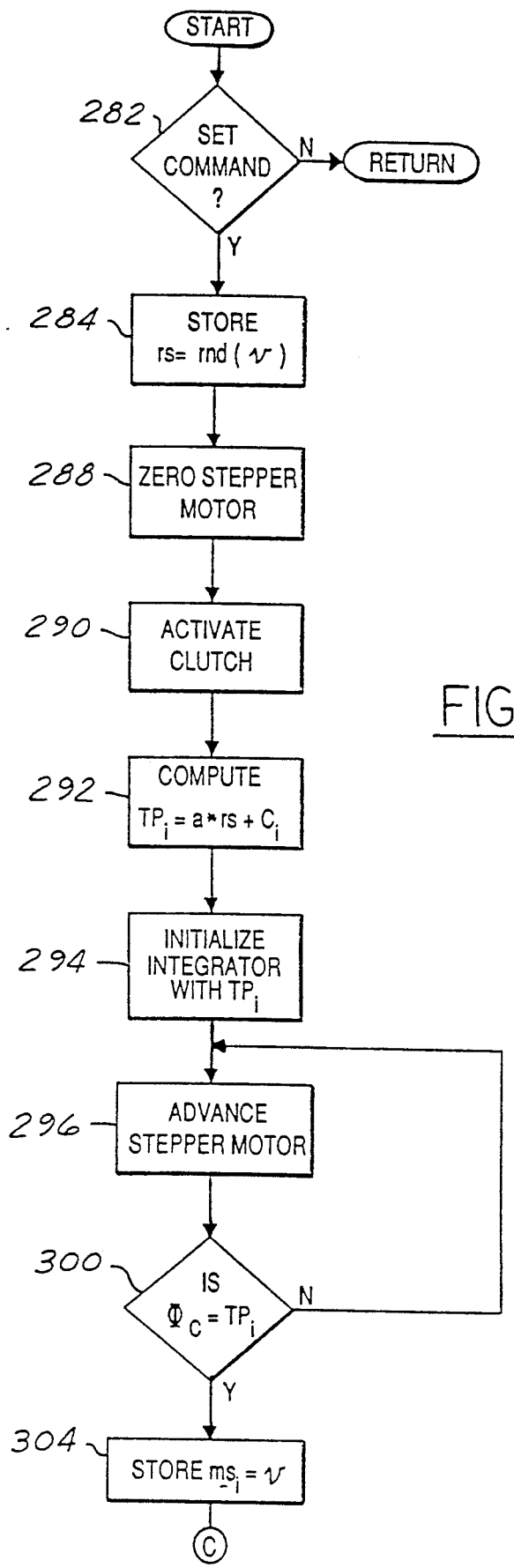
FIGS. 6A-6B are a flowchart showing process steps performed by a microcomputer to initialize speed control operation.
Figure 6B:
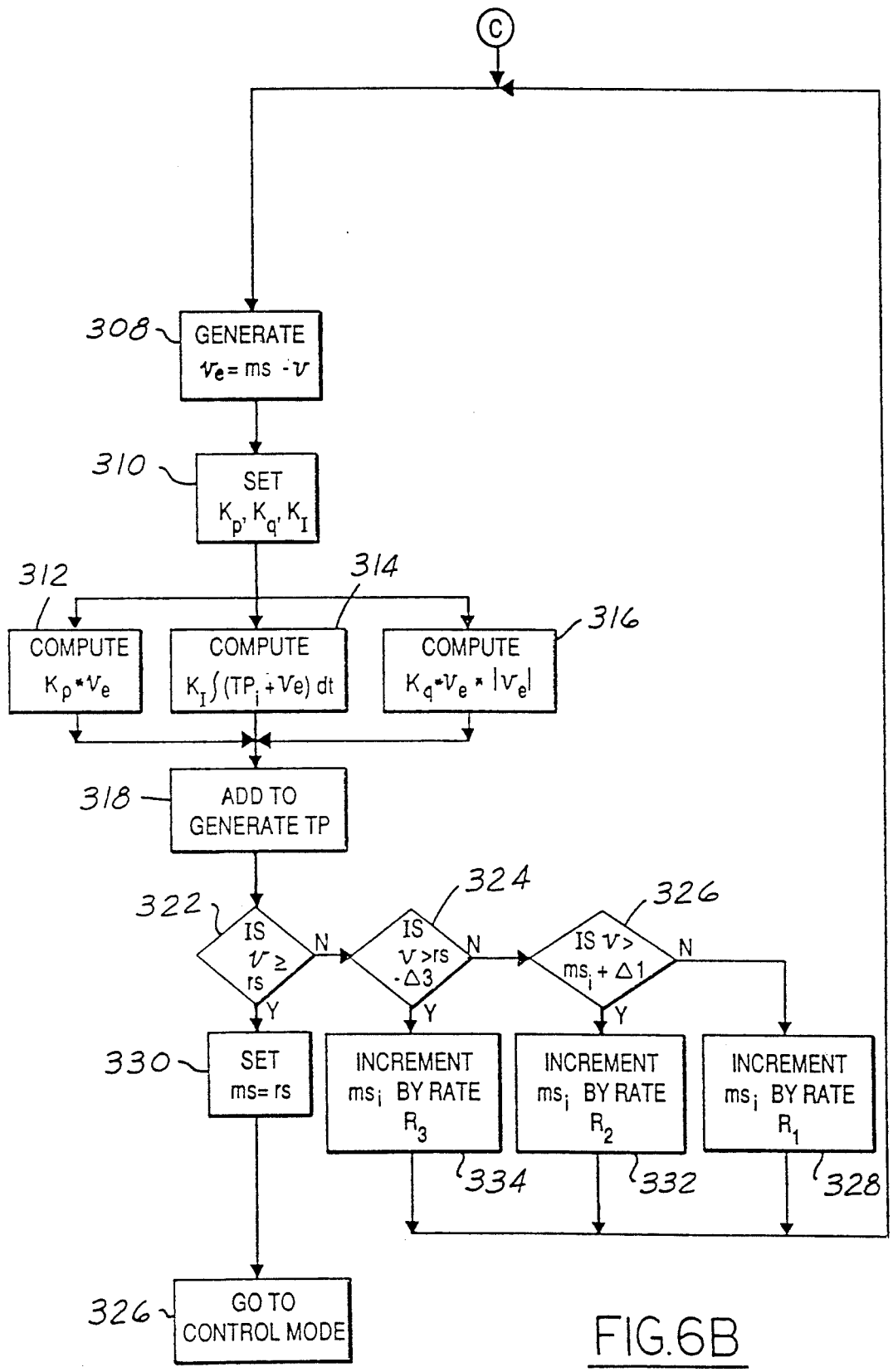

Referring to FIGS. 6A-6B and 7, initialization of speed control operation is described in response to a SET COMMAND. Upon recognition of the SET COMMAND in step 282, a rounded off value of actual vehicle speed at the time of actuation of SET/ACCEL switch 36 is stored as a set or desired speed in the rs memory location (see step 284). Stepper motor 50 is then zeroed or turned to an idle position and electromagnetic clutch assembly 56 engaged during steps 288 and 290.

Referring to process steps 292-304 in FIG. 6A and also referring to the graph shown in FIG. 7 a description is provided for initializing speed control system 10 with an initial throttle position computed as follows. Throttle position is calculated by assuming a straight line relationship between vehicle speed and throttle position as illustrated by line 280 in FIG. 7. This illustrative line is shown having a slope "a" and an offset value $c_i$ which intersects the throttle position axis. Offset $c_i$ corresponds to the throttle position at idle after slack and mechanical stacking in the throttle cable and associated mechanical linkage have been taken in. Accordingly, initial throttle position $TP_i$ is calculated as follows: $TP_i = a^*rs + c_i$ (see step 292 in FIG. 6).

Referring back to FIG. 6A, the integrator memory is initialized with initial throttle position $TP_i$ in step 294 a SET COMMAND (as described in greater detail later herein, a similar initializing process occurs after a RESUME COMMAND or ACCEL COMMAND). Stepper motor 50 is then advanced until its angular position, as represented by phase count $\Phi_c$, reaches initial throttle position $TP_i$ as shown by process steps 298 and 300. Actual vehicle speed existing at that time is then stored as initial reference speed $ms_i$ during process step 304. As described in greater detail later herein, reference speed ms is incremented in a preprogrammed manner until desired speed rs is achieved.

The above operation is illustrated by the waveforms shown in FIGS. 8A-8C for a hypothetical speed control operation. It is noted that after operator actuation of SET/ACCEL switch 36 at time t1 the vehicle speed droops as the operator releases the accelerator pedal (see FIG. 8B). Concurrently, the integrator storage location is initialized with target throttle position $TP_i$ and stepper motor 50 turned to target throttle position $TP_i$ (see FIG. 8C). Stated another way, stepper motor 50 is advanced until its total phase count $\Phi_c$ reaches target throttle position $TP_i$ at time t2. Actual vehicle speed at such time is then stored as initial reference speed $ms_i$. As described in greater detail below, reference ms is then incremented in a preprogrammed manner and closed loop speed control operation is concurrently commenced to gradually increase vehicle speed until desired speed rs is achieved at time t3.

Referring to FIG. 6B, speed error signal $v_e$ is generated by subtracting actual vehicle speed (v) from reference speed ms as reference speed ms is being incremented (step 308). Proportional gain constant $k_p$, quadratic gain constant $k_q$, and integral gain constant $k_I$ are set in a manner described later herein with particular reference to FIGS. 15 and 16. During steps 312, 314, 316, and 318 throttle position (TP) is determined in the same manner as previously described herein with particular reference to process steps 250, 252, 254, and 258 shown in FIG. 3. That is, the throttle position commanded of stepper motor 50 is generated as follows:

$$TP = k_p^* v_e + k_{I\sim v_e} dt + TP_i + k_q^* v_e^* |v_e|$$

The programming for incrementing reference speed ms is provided in steps 322-334. In general, a preselected number of ramps are utilized dependent upon vehicle speed. If vehicle speed is less than initial reference speed $ms_i$ plus predetermined deviation $\Delta_1$ (such as one mile per hour), then initial reference speed $ms_i$ is incremented at predetermined Rate 1. When vehicle speed is less than desired speed rs by predetermined amount $\Delta_3$ such as three miles per hour, (see process step 324), but greater than initial reference speed $ms_i$ plus $\Delta_1$ (see process step 326), then reference speed ms is incremented at predetermined Rate 2.

When vehicle speed v is equal to desired speed rs (see step 322), reference speed ms is set equal to desired speed rs during step 330. As shown in the hypothetical example in FIG. 8B, ms is incremented at Rate 3 from $ms_i$ to rs for providing gradual vehicle acceleration to reference speed rs. Subsequently, the control mode is entered as indicated by process step 336 in FIG. 6.

ADAPTIVE LEARNING

Updating of offset value $c_i$ during the Control mode for use in subsequent calculation of target throttle position $TP_i$ is now described with reference to FIGS. 7 and 9. It is noted that speed control during the Control mode of operation was previously described with reference to FIG. 3. Referring first to FIG. 9, the contents of the integrator storage location are sampled during step 352 each background loop upon entering the control mode (see step 350). Since the integrator contents represent the integral of speed error signal $v_e$ plus the initial throttle position, this value $(I_{i+1})$ is approximately equivalent to the actual throttle position. During step 354, the product of desired speed rs times slope "a" of the curve represented in FIG. 9 is subtracted from sampled integrator value $I_{i+1}$ to generate an updated offset value $c_{i+1}$. Offset value $c_{i+1}$ is then stored during step 356 for use in a subsequent calculation of target throttle position $TP_i$ as previously described herein with reference to process step 292, 294, 298, and 300 shown in FIG. 6A.

The above described steps for adaptively learning offset value $c_{i+1}$ and utilizing such value to compute a target throttle position $(TP_i)$ may be better understood by reviewing the hypothetical example of operation presented in FIG. 7. As previously discussed herein, line 280 represents an estimate of throttle position versus vehicle speed. Offset value $c_i$ represents throttle position at idle. However, initial reference line 280 represents only a best guess relationship, it will vary between different vehicles, vehicle accessories, and throttle cable slack.

During each background loop of microcomputer 40 (FIG. 9), the integrator storage location is sampled $(I_{i+1})$. This value, as previously discussed, represents actual throttle position. Thus, line 280 should be shifted in a parallel manner such that it intersects sampled integrator value $I_{i+1}$. Stated another way, offset value $c_i$ is replaced by updated offset $c_{i+1}$ as a function of sampled integrator value $I_{i+1}$ (i.e., $c_{i+1}$ equals $I_{i+1} - a^*rs$). Accordingly, offset value $c_i$ is adaptively learned or updated such that line 280 becomes shifted to line 280' which in this example represents a true relationship between vehicle speed and throttle position for the particular vehicle upon which speed control system 10 is installed.

Referring to the example shown in FIG. 7, speed control system 10 maintains vehicle speed at reference speed rs.

In accordance with the description provided above with reference to FIGS. 7 and 9, speed control system 10 is initialized with an adaptively learned target throttle position such that desired speed rs is achieved in a stable manner with minimal undershoot, overshoot, or abrupt changes in vehicle speed. In addition, the adaptive learning process of target throttle positioning enables speed control system 10 to automatically adapt to different vehicles, and to variations among the same vehicle upon which it may be installed.

RESUME MODES

Operation during the resume mode is now described with reference to the flowchart of process steps performed by microcomputer 42 shown in FIGS. 10A-10B, and the graphical representation of a hypothetical resume operation shown in FIGS. 11A-11C. After a RESUME COMMAND is recognized in step 382, stepper motor 50 is turned to an idle position (see step 384) and electromagnetic clutch assembly 56 activated (see step 388).

During step 392, initial throttle position $TP_i$ is computed by multiplying vehicle speed existing at the time resume switch 38 is depressed times slope value "a" and adding adaptively learned offset value $c_i$. The integrator memory is then initialized with the computed initial target position $TP_i$ (see step 394). Stepper motor 50 is advanced until it reaches a phase count associated with target throttle position $TP_i$ (see steps 398 and 400). Actual vehicle speed v is then stored as reference speed $ms_i$ in step 404.

During step 408, speed error signal $v_e$ is computed by subtracting vehicle speed from reference speed ms. Proportional gain constant $k_p$, quadratic gain constant $k_q$, and integral gain constant $k_I$ are set in step 410. During steps 412, 414, 416, and 418 throttle position TP is determined in the same manner as previously described herein with particular reference to process steps 250, 252, 254, and 258 shown in FIG. 3.

Figure 10A:
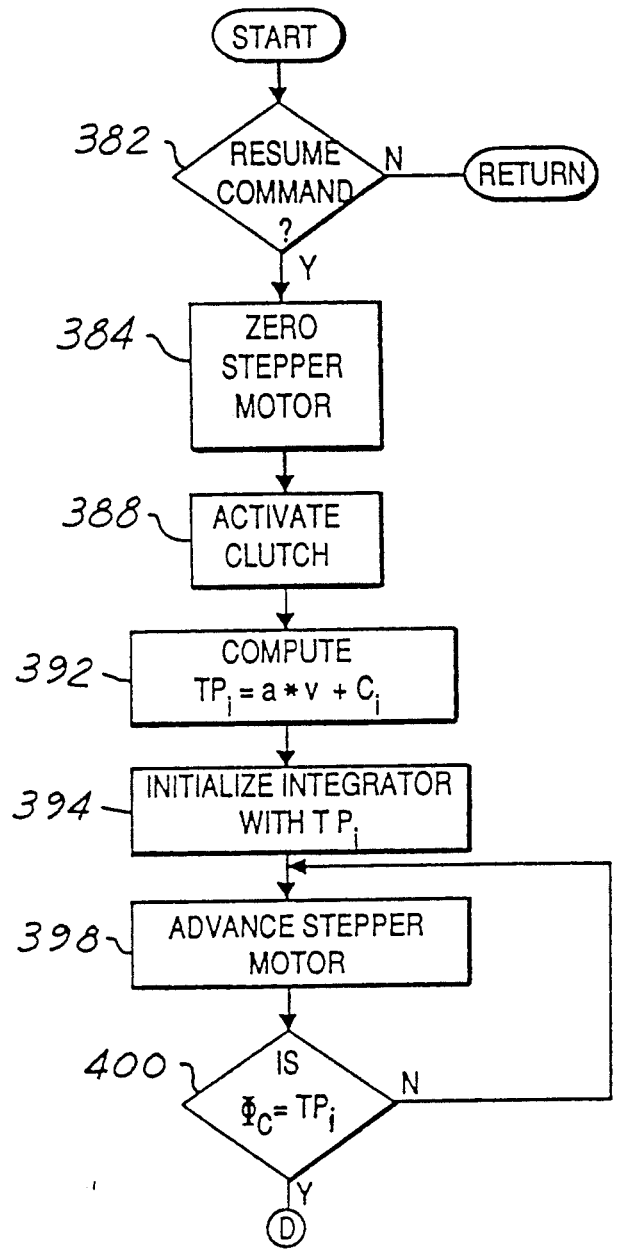
FIGS. 10A-10B are a flowchart of process steps performed by a microcomputer in controlling speed control operation during a particular embodiment of a resume mode.
Figure 10B:
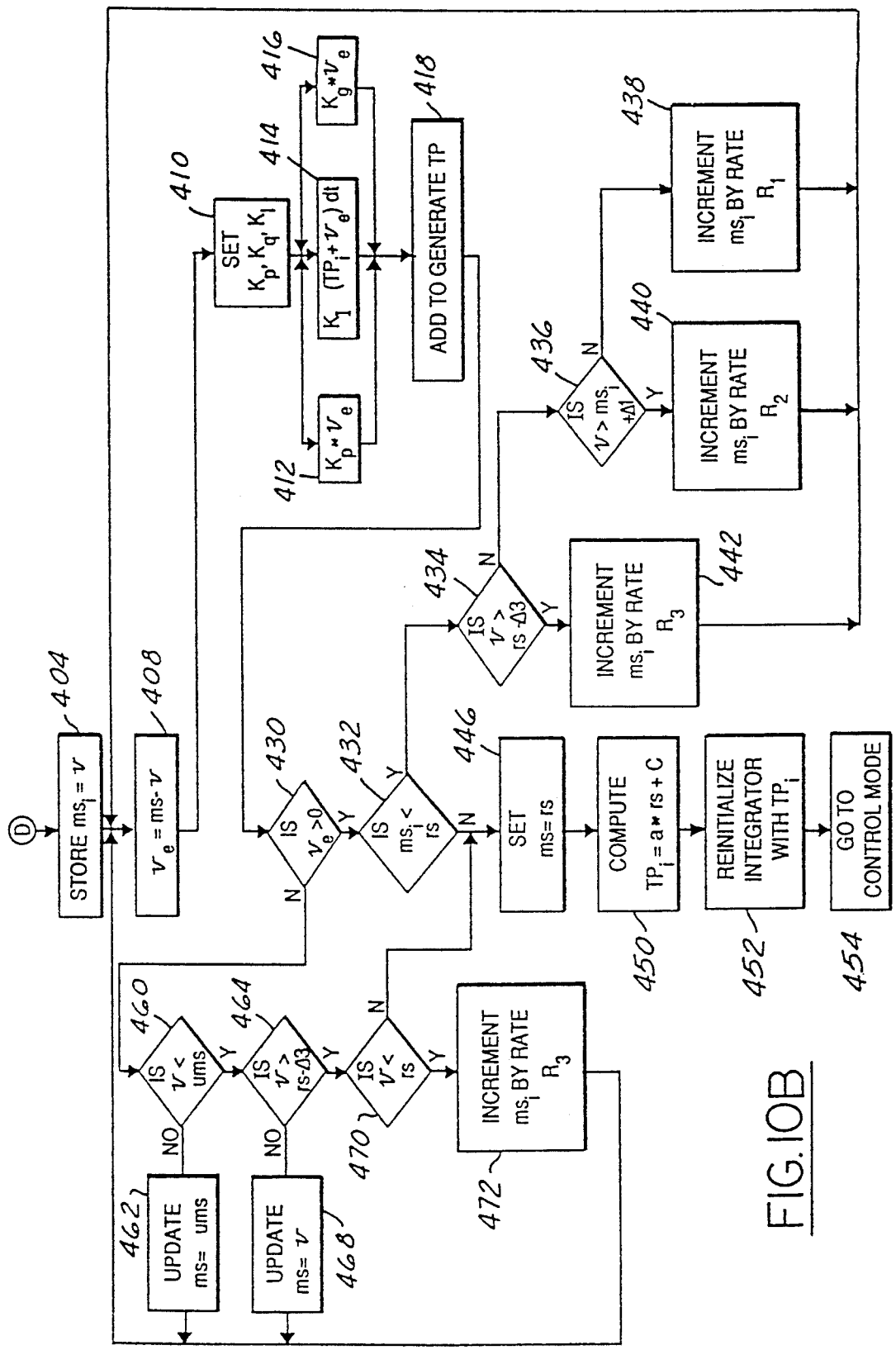
Figure 11A:
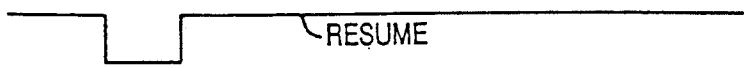
FIGS. 11A-11C are a graphical illustration of speed control operation during the resume mode of operation described with reference to FIGS. 10A-10B.
Figure 11B:
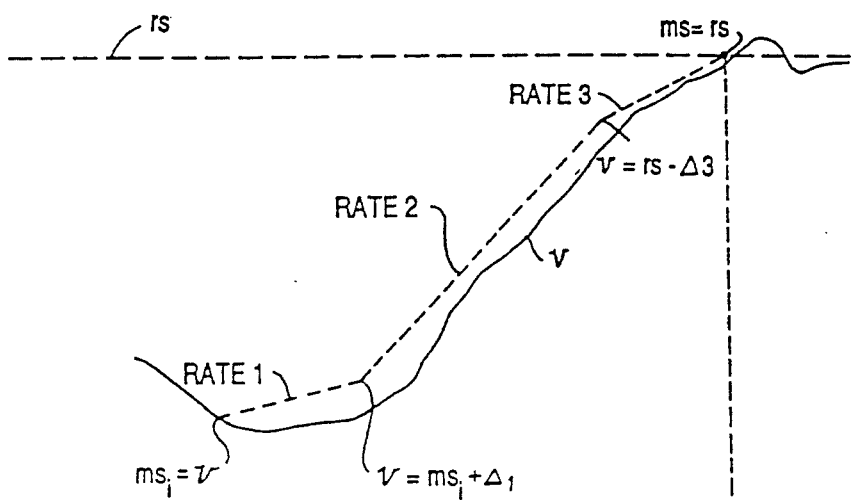
Figure 11C:
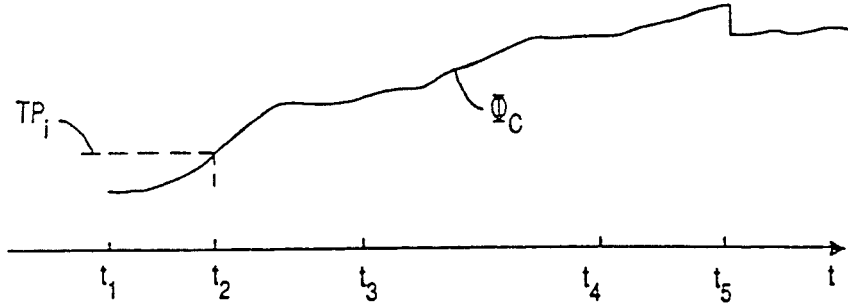
Figure 12A:
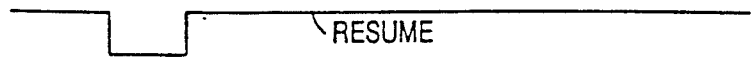
FIGS. 12A-12C are another graphical illustration of speed control operation during the resume mode of operation described with reference to FIGS. 10A-10B.
Figure 12B:
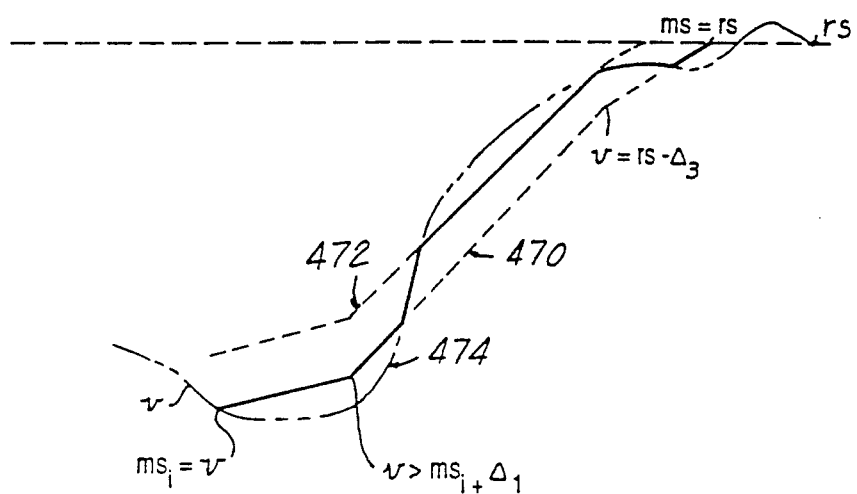
Figure 12C:
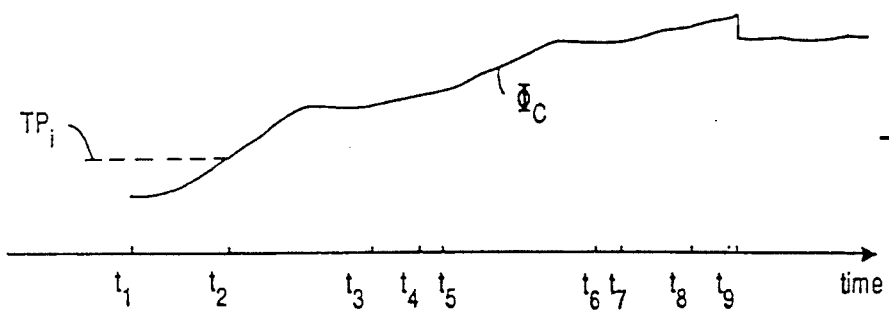

The operation of microcompter 42 for incrementing reference speed ms to achieve resume or set speed rs is now described with continuing reference to FIGS. 10A-10B, FIGS. 11A-11C, and FIGS. 12A-12C. FIGS. 11A-11D represent a hypothetical resume operation wherein reference speed ms is greater than actual vehicle speed v (i.e., $v_e$>zero) throughout resume Operations. On the other hand, FIGS. 12A-12C represent a more complex hypothetical resume operation wherein actual vehicle speed v exceeds reference speed ms (i.e., $v_e$<zero) during a portion of resume operation.

Resume speed control operation is first described of conditions when vehicle speed v is less than reference speed ms (i.e., $v_e$ >zero). After a determination is made that the speed error signal $v_e$ is positive (see step 430) and reference speed ms is less than set speed rs (see step 432), vehicle speed v is compared to various speed ranges (see steps 434, 436, and 438). More specifically, when vehicle speed v is less than predetermined value $\Delta_3$ from set speed rs and within predetermined value $\Delta_1$ from initial reference speed $ms_i$, reference speed ms is incremented at predetermined rate $R_1$ as shown by steps 434, 436, and 438. When vehicle speed v exceeds initial reference speed $ms_i$ plus $\Delta_1$ (see step 436), and is less than reference speed rs minus $\Delta_3$ (see step 434), reference speed ms is incremented at rate $R_2$ (see step 440). If vehicle speed v is greater than set speed rs minus $\Delta_3$ (see step 434), reference speed ms is incremented at rate $R_3$ (see step 442) until reference speed ms reaches set speed rs (see steps 432 and 446).

When reference speed ms reaches set speed rs, the throttle angle is greater than that required to maintain set speed rs because the vehicle has been accelerating. Speed overshoot would therefore result unless corrected for. Process steps 450, 452, and 454 prevent or substantially reduce such overshoot. More specifically, a new target throttle position is calculated based upon set speed rs during step 450 where $TP_i = c_i + a*rs$. Since the adaptive learning previously described herein with particular reference to FIG. 9 has updated offset $c_i$, the calculated target throttle position should be highly accurate. This calculated target throttle position reinitializes the integrator storage position when reference speed ms is incremented to set speed rs thereby preventing speed overshoot. Afterwards, the control mode is entered as shown by step 454.

The operation presented above may be better understood by referring to the graphical representation of an example of resume operation presented in FIGS. 11A-11C. Upon depression of resume switch 38 at time $t_1$ (see FIG. 11A), the integrator storage location is initialized with target throttle position $TP_i$ calculated as a function of vehicle speed v at time $t_1$ (see FIG. 11C). Stepper motor 50 is then advanced until phase count $\phi_c$ reaches target throttle position $TP_i$ at time $t_2$ (FIG. 11C).

Referring to FIG. 11B, reference speed ms is initialized with vehicle speed v when stepper motor 50 reaches target throttle position $TP_i$ at time $t_2$. Initial reference speed ms. is then gradually advanced at rate $R_1$ until vehicle speed v reaches initial reference speed $ms_i$ plus $\Delta_1$ at time $t_3$. Subsequently, reference speed $ms_i$ is incremented at rate $R_2$ until vehicle speed v reaches set speed rs minus $\Delta_3$ at time $t_4$. Thereafter, reference speed ms is incremented at rate $R_3$ until it reaches set speed rs at time $t_5$. The integrator storage location is then reset with a target throttle position based on set speed rs ($TP_i = a*rs + c_i$). As shown in FIG. 11C, this integrator resetting operation reduces throttle position thereby reducing or eliminating any speed overshoot.

Speed control operation when speed error signal $v_e$ is negative (i.e., v>ms) during a portion of resume operation is now described with continuing reference to FIGS. 10A-10B, and reference to the hypothetical example graphically shown in FIGS. 12A-12C. Such operation occurs under resume speed control operation while the operator is accelerating or while traveling downhill. Vehicle speed is first compared to an upper reference speed ums (see step 460) which, in this particular example, is generated by adding a predetermined value $\Delta_m$ to reference speed ms during each background loop of microcomputer 42. When vehicle speed v is greater than ums, reference speed ms is incremented to upper reference speed ums as shown in steps 460 and 462. When vehicle speed v is less than upper reference speed ums and is also less than set speed rs minus $\Delta_3$ (steps 460 and 464), then reference speed ms is updated with vehicle speed v (step 468). Referring to steps 464, 470, and 472, reference speed ms is incremented at rate $R_3$ when vehicle speed is within a predetermined range $\Delta_3$ of set speed rs. When vehicle speed v reaches rs (step 470), reference speed ms is set to set speed rs and the integrator storage location reset as previously described herein with relation to process steps 450, 452, and 454. That is, the integrator is reinitialized with a target throttle position as a function of set speed rs ($TP_i = a*rs + c_i$).

The above described resume operation having a negative speed error during a portion of the resume mode may be better understood by the hypothetical example of operation shown in FIGS. 12A-12C. Resume switch 38 is shown actuated at time $t_1$ in FIG. 12A. As shown in FIG. 12C, the integrator storage location is then set with a target throttle position calculated in relation to vehicle speed v existing at time $t_1$ ($TP_i = a*v + c_i$) in the manner previously described. In response, stepper motor 50 is turned to target throttle position $TP_i$. Upon reaching the target throttle position at time $t_2$, reference speed ms is initialized with vehicle speed v (see FIG. 12B). Reference speed ms is then incremented as described below and feedback speed control commenced based upon speed error signal $v_e$ ($v_e = ms - v$).

Referring to the example presented in FIG. 12B, line 470 represents reference speed ms incremented at rates $R_1$, $R_2$, and $R_3$ under hypothetical conditions where vehicle speed v is less than reference speed ms. Similarly, line 472 represents upper reference speed ums which is incremented at rates $R_1$, $R_2$, and $R_3$ under hypothetical conditions where vehicle speed v is less than upper reference speed ums. Line 474 represents actual vehicle speed v for the example presented herein. And, the solid portions of lines 470, 472, and 474 represent the actual reference speed ms utilized for speed error control in the particular example presented herein.

Continuing with FIG. 12B, reference speed ms is increased at rate $R_1$ until it is greater than initial reference speed $ms_i$ plus $\Delta_1$ as shown at time $t_3$. Thereafter, reference speed ms is increased at rate $R_2$. As shown in the previous example presented herein with reference to FIGS. 11A-11C, reference speed ms would increase at rate $R_2$ until vehicle speed v reaches set speed rs minus $\Delta_3$. However, as shown in the particular example presented in FIG. 12B, vehicle speed v exceeds reference speed ms at time $t_4$. Reference speed ms is therefore set to vehicle speed v at time $t_4$.

Vehicle speed v is shown exceeding upper reference speed ums at time $t_5$. This may be an indication of acceleration while traveling downhill. Accordingly, reference speed ms is then limited to upper reference speed ums (line 472) at time $t_5$. Between times $t_6$ and $t_8$, vehicle speed v is again shown occurring between upper reference speed ums and the lower or base reference speed shown by line 470. Reference speed ms is therefore set to vehicle speed v (line 474). After time $t_8$, vehicle speed v is shown falling below reference line 470. Accordingly, reference speed ms is incremented at rate $R_3$ as shown by line 470 until it reaches set speed rs at time $t_9$. Upon reaching set speed rs, the integrator storage location is reset with a target throttle position based upon set speed rs as previously described herein ($TP_i = a*rs + c_i$).

In accordance with the resume operation described herein with reference to steps 460-472 and 446-454 presented in FIG. 10 and FIGS. 12A-12C, smooth resume operation is provided which adapts to actual vehicle speed under conditions of operator acceleration and downhill operation. In addition, the unique manner of initializing the integrator with throttle position based upon vehicle speed v and reinitializing the integrator with target throttle position based upon set speed rs, provides smooth and stable operation with minimal undershoot or overshoot.

GAIN CONTROL—CONTROL MODE

An embodiment is described with reference to FIGS. 13 and 14 wherein gain values $k_p$, and $k_I$ are adjusted during the control mode as a function of speed error $v_e$. In this particular example, speed control response is reduced at small speed errors and enhanced at large speed errors such that quadratic control component $k_q*v_e*|v_e|$ is not utilized. Thus the gain control operation described herein is an alternate embodiment to the quadratic control previously described herein.

The process steps performed by microcomputer 108 in adjusting gain constants $k_p$ and $k_I$ are first described with reference to the flowchart shown in FIG. 13. More specifically, after verification that speed control operation is in the control mode (step 490), than preselected error $v_e$, and vehicle speed v is absolute speed error $v_e$ is compared to preselected error $\Delta_e$ in step 492. When speed error $v_e$ is less than preselected error $\Delta_e$, and vehicle speed v is within a high speed range (step 494), gain constant $k_p$ is generated as a function of speed error $v_e$ during step 498 (i.e., $k_p = f_1(v_e)$). Similarly, integral gain $k_I$ is also generated as a function of speed error $v_e$ during step 498 (i.e., $k_I = f_1'(v_e)$). In this particular example, the functional relationship is linear as shown in FIG. 14.

Continuing with the description of operation when the absolute value of speed error $v_e$ is less than $\Delta_e$, three separate functional relationships are generated for gain value $k_p$, dependent upon whether vehicle speed v is in a high range (see steps 494 and 498 where $k_p = f_1(v_e)$ as described above), or a mid-range (see steps 500 and 502 where $k_p = f_2(v_e)$), or a low range (see steps 504 and 506 where $k_p = f_3(v_e)$). Stated another way, the relationship between gain value and speed error is decreased for lower speed ranges such that:

$$f_1(v_e) > f_2(v_e) > f_3(v_e).$$

Substantially similar operations are performed for integral gain value $k_I$. More specifically, at high speed ranges $k_I = f_1'(v_e)$ as shown in steps 494 and 498. At mid-speed ranges $k_I = f_2'(v_e)$ as shown in steps 500 and 502. And low speed ranges $k_I = f_3'(v_e)$ as shown in steps 504 and 506.

Figure 13:
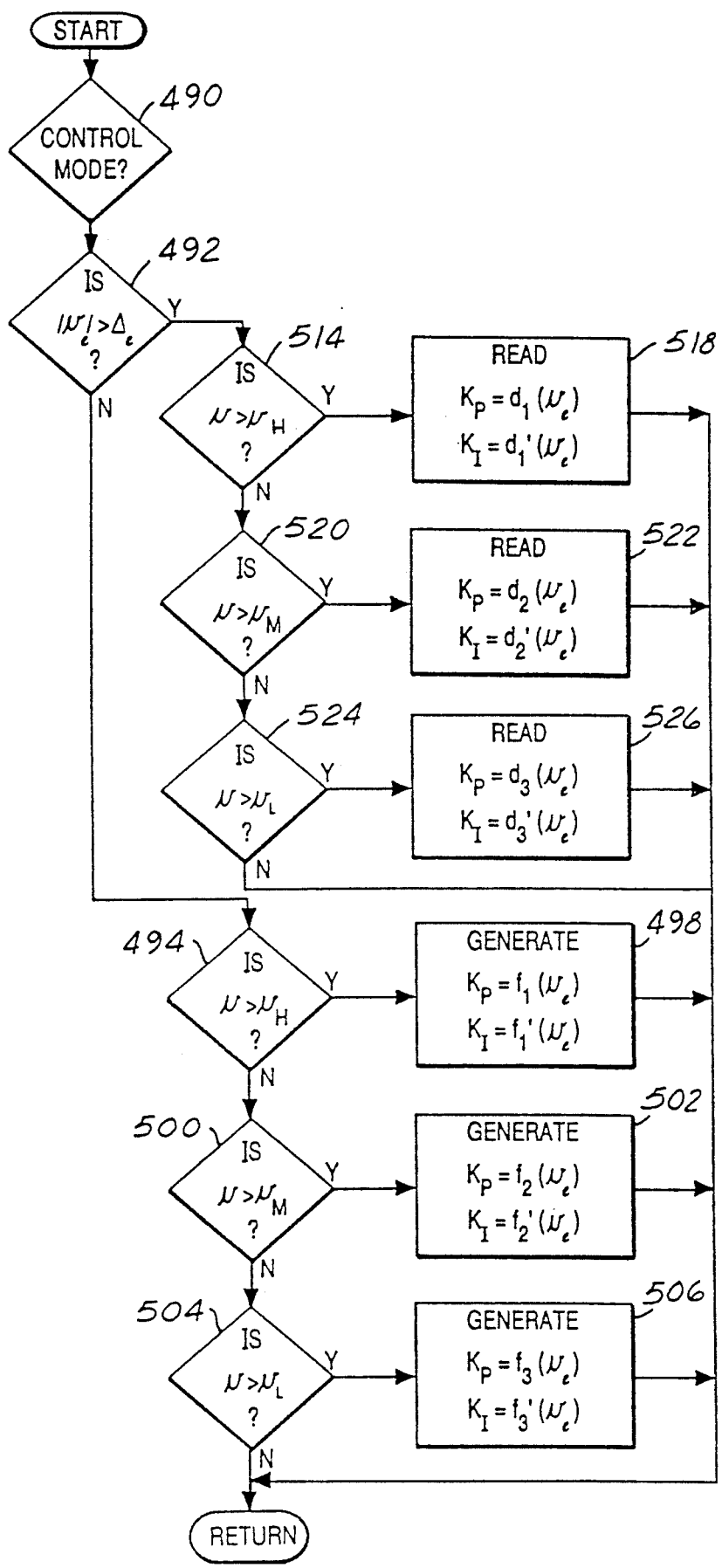
FIG. 13 is a flowchart of process steps performed by a microcomputer in controlling speed control operation by adjusting speed control gains as a function of the speed error signal.
Figure 14:
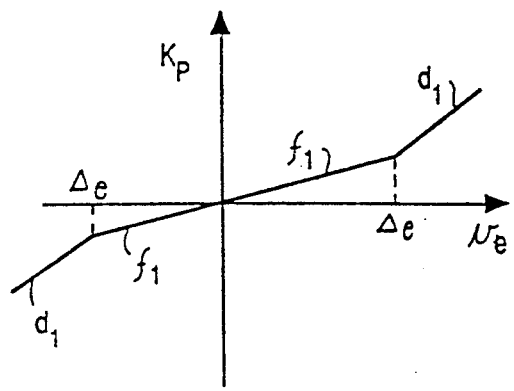
FIG. 14 is a graphical illustration of one particular speed control gain adjusted in accordance with the operation described with reference to FIG. 13.

Continuing with FIGS. 13 and 14, variable gain operation is now described when the absolute value of speed error $v_e$ is greater than the preselected error $\Delta_e$ (step 492). The functional relationship between gain value $k_p$ and speed error $v_e$ is preselected as one of three linear relationships ($d_1$, $d_2$, or $d_3$) dependent upon whether vehicle speed v is in a high range, mid-range, or low range, respectively. More specifically, when vehicle speed v is in the high range (step 514), gain $k_p = d_1(v_e)$ as shown in step 518. When vehicle speed v is in a mid-range, $k_p = d_2(v_e)$ as shown in steps 520 and 522. And, when vehicle speed v is in a low range (step 524) $k_p = d_3(v_e)$ as shown in step 526.

Stated another way, the functional relationship, which is linear in this example, between gain $k_p$ and speed error $v_e$ is increased when vehicle speed changes from the high range to the mid-range and then to the low range. That is, $$d_1(v_e) > d_2(v_e) > d_3(v_e).$$

Similar process steps are followed to generate gain $k_I$ as a function of speed error $v_e$. Again, the relationship in this example is linear, and the linear relationship is increased inversely as a function of vehicle speed range. That is, $k_I = d_1'(v_e)$ in the high speed range, $k_I = d_2'(v_e)$ in the mid-speed range, and $k_I = d_3'(v_e)$ in the low speed range where:

$$d_1'(v_e) > d_2'(v_e) > d_3'(v_e).$$

The operation and advantages of the embodiment shown in FIG. 13 may be better understood by discussing the graphical illustration of operation presented in FIG. 14. Amplitude of gain $k_p$ is plotted against speed error $v_e$. Although this particular example illustrates gain $k_p$ at a high speed range, those skilled in the art will recognize its teaching is applicable to all three speed ranges and also to gain $k_I$.

FIG. 14 shows a first linear relationship (labeled as f1) between gain $k_p$ and speed error $v_e$ until speed error $v_e$ reaches predetermined speed error $\Delta_e$. At such time, the linear relationship between gain k and speed error $v_e$ is increased (labeled as d$_1$). An advantage obtained from the illustrated embodiment is low gain amplitude at small speed errors and substantially higher gain amplitude at high speed errors. Thus, when speed errors are relatively small such as when cruising down a super highway, speed control response is relatively stable and the hunting inherent in some prior systems is avoided. On the other hand, when speed errors increase beyond a preselected value such as when encountering a road grade, the gain amplitude of the speed control system is substantially increased such that speed undershoot (such as when encountering a hill) or speed overshoot (such as when cresting a hill) are thereby avoided. The gain relationship at positive or negative speed errors is also alterable to compensate for variations in vehicle response to positive or negative speed errors. Thus, stable operation is achieved while providing a system which rapidly corrects for alterations in road surface.

GAIN CONTROL—RESUME MODE

An embodiment having variable gain operation which is utilized to advantage during an alteration in desired speed is now described with reference to FIGS. 15 and 16. Such alterations in desired speed occur, for example, during the Resume Mode, ACCEL Mode, Coast Mode, and Tap-Up Mode (i.e., incrementing desired speed dependent upon the number of times the SET/ACCEL switch as been tapped). The particular example presented in FIGS. 15 and 16 relates to the Resume Mode, although the teachings of gain control provided herein is applicable to any desired speed alteration.

It is also noted that the gain operation described herein presents an alternative to a particular aspect of the Resume Mode of operation previously described with reference to FIGS. 10A-10B, 11A-11C, and 12A-12C. In the previously described Resume Mode of operation, desired speed ms was incremented at a plurality of preselected rates to asymptotically converge upon reference speed rs. In the particular example now presented in FIGS. 15 and 16, a single rate is utilized and the gain values ($k_p$, $k_I$, and $k_q$) are varied to achieve an asymptotic approach. Other aspects of resume operation, however, such as initializing and reinitializing the integrator, storage location remain substantially the same.

Figure 15:
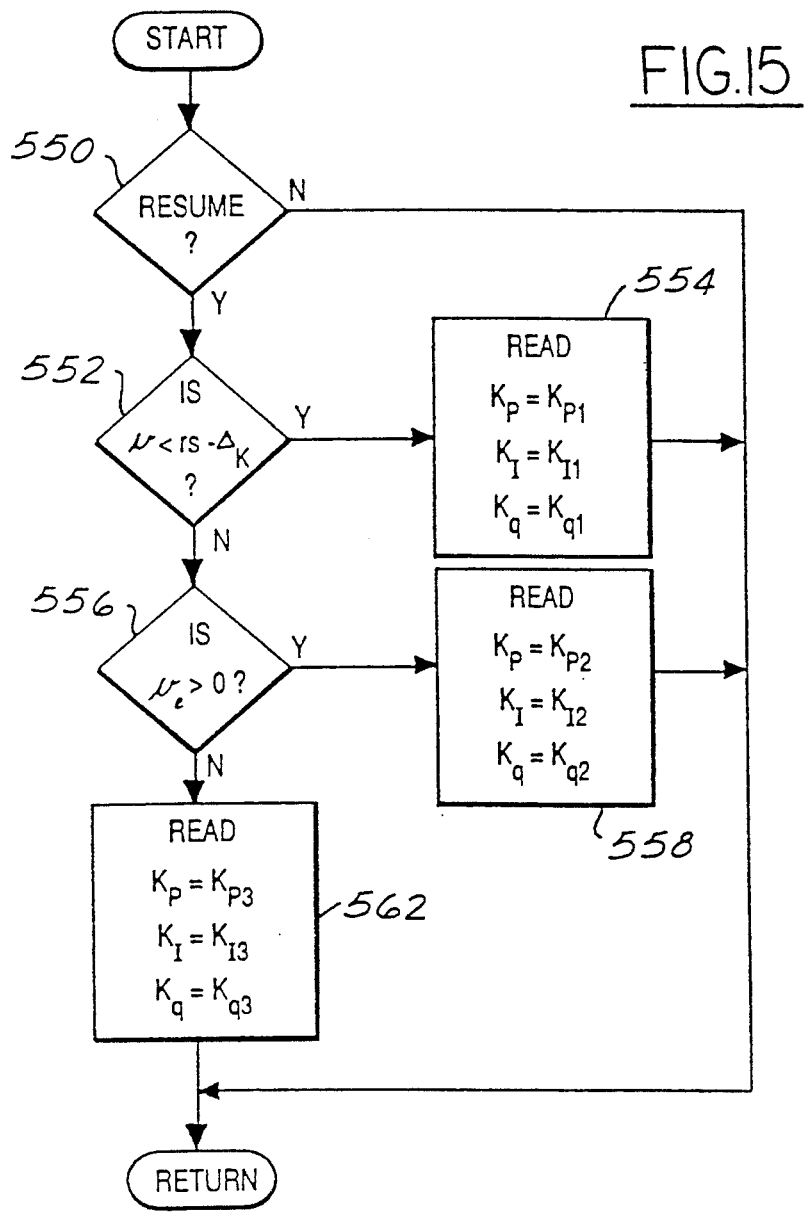
FIG. 15 is a flowchart of process steps performed by a microcomputer in adjusting various speed control gain constants during the resume mode of operation.

Referring specifically to FIG. 15, after resume mode operation is detected in process step 550, vehicle speed v is checked to whether it is within predetermined range $\Delta_k$ of resume or reference speed rs during step 552. When vehicle speed is less than range $\Delta_k$ from reference speed rs, gain constants $k_{p1}$, $k_{I1}$, and $k_{q1}$ are read from memory for respective gain values $k_p$, $k_I$, and $k_q$ as shown in step 554. These gain values are greater than the gain values which will be described below such that more rapid convergence of speed control operation towards reference speed rs is provided after initiation of the Resume Mode of operation. Accordingly, an advantage is obtained of minimizing any droop in vehicle speed which may otherwise occur upon initiation of the Resume Mode or other speed alteration modes of operation.

Continuing with FIG. 15, when vehicle speed v is within range $\Delta_k$ of reference speed rs (step 552), and speed error $v_e$ is positive (i.e., vehicle speed v is less than desired speed ms as determined in step 556) gain values $k_{p2}$, $k_{I2}$, and $k_{q2}$ are read from memory during step 558. The gain constants subscripted with 2 are less than those gain constants subscripted with 1. Accordingly, when the vehicle speed is within range $\Delta_k$ from reference speed rs, vehicle speed converges more gradually towards the reference speed.

When vehicle speed v is within range $\Delta_k$ of reference speed rs, and speed error $v_e$ is negative, gain constants $k_{p3}$, $k_{I3}$, and $k_{q3}$ are read from memory during step 562. The gain constants subscripted with 3 are less than the gain constants subscripted with 1. Accordingly, when resume or reference speed rs is being approached and vehicle speed v is overshooting desired speed ms (such as when traveling on a down grade) relatively small gain constants are utilized for convergence upon reference speed rs with minimal or substantially no overshoot.

Figure 16:
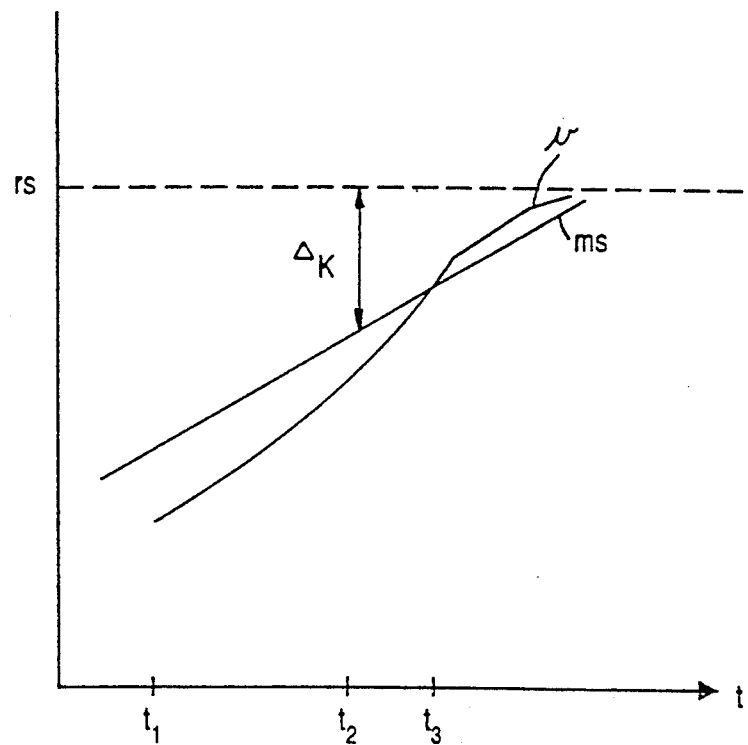
FIG. 16 is a graphical illustration of operation during the resume control described with reference to FIG. 15.

The above described operation may be better understood by referring to an example of resume operation presented graphically in FIG. 16. In this particular example, resume operation commences at time $t_1$. For clarity, previously described resume operation such as initializing the integrator with a best guess throttle position turning stepper motor 50 to the best guess position and reinitializing the integrator upon reaching reference speed rs are not repeated herein.

Between times $t_1$ and $t_2$ in the example presented in FIG. 16, vehicle speed v is less than range $\Delta_k$ from reference speed rs. Accordingly, gain constants subscript with 1 such as $k_{p1}$ are utilized by speed control system 10. During the interval between times $t_2$ and $t_3$, vehicle speed v is within range $\Delta_k$ and also less than desired speed ms. Accordingly, gain constants subscripted with 2 such as $k_{p2}$ are utilized to more gradually converge upon reference speed rs.

After time $t_3$, vehicle speed v is shown greater than ms (i.e., speed error $v_e$ is negative) so that gain constants subscripted with 3 are utilized. In such circumstance, an indication of speed overshoot is provided indicating that either the vehicle is on a down grade or speed control system 10 had previously over compensated. Gain constants subscripted with 3 will slow down the convergence towards reference speed rs thereby minimizing or eliminating any speed overshoot.

In accordance with the above operation, rapid convergence is provided at the initiation of a speed alteration such as during initiation of the Resume Mode. When within a predetermined range, convergence is slowed and slowed further when any indication of overshoot is provided. An advantage is thereby provided of rapid yet smooth convergence to reference speed rs.

This concludes the Description of the Preferred Embodiment. The reading of it by those skilled in the art will bring to mind many alterations and modifications without departing from the spirit and scope of the invention. For example, speed control operation is illustrated during various modes of operation such as the Resume Mode whereas the teachings of the invention are applicable to other modes of operation wherein the desired speed is altered. Accordingly, it is intended that the scope of the invention be limited only by the following claims.

What is claimed:

1. A speed control system controlling the engine throttle to maintain vehicle speed at a desired speed, comprising:

difference means for generating an error signal by comparing the vehicle speed to the desired speed;

correction means for providing a correction signal related to said error signal and multiplying said correction signal by an adjustable gain value;

gain adjusting means for providing said adjustable gain value with an amplitude generated as a linear function of amplitude of said error signal, said gain value amplitude increasing in linear proportion to increases in said error signal and decreasing in linear proportion to decreases in said error signal; and actuating means for actuating the engine throttle in relation to said product of said correction signal times said gain value.

2. A speed control system for controlling the engine throttle to maintain vehicle speed at a desired speed, comprising:

comparison means for generating an error signal by comparing the vehicle speed to the desired speed;

correction means for providing a plurality of correction signals each related to said error signal and multiplying each of said correction signals by one of an equal plurality of corresponding gain values;

gain providing means for providing each of said corresponding gain values with a variable amplitude generated as a linear function of said error signal, said corresponding gain value having a first linear relationship to said error signal when said error signal is less than a preselected amplitude and having a second linear relationship to said error signal when said error signal exceeds a preselected amplitude;

summing means for generating a control signal by summing each product of one of said correction signals times one of said corresponding gain values; and actuation means for actuating the engine throttle in relation to said control signal.

3. The speed control system recited in claim 2 wherein said gain providing means provides said second linear relationship with greater sensitivity than said first linear relationship.

4. The speed control system recited in claim 2 wherein said correction means provides a first correction signal by multiplying said error signal by a first one of said corresponding gain values.

5. The speed control system recited in claim 4 wherein said correction means provides a second correction signal by integrating said error signal and multiplying said integrated error signal by a second one of said corresponding gain values.

6. A speed control method controlling the engine throttle to maintain vehicle speed at a desired speed, comprising the steps of:

comparing the vehicle speed to the desired speed, comprising the steps of:

comparing the vehicle speed to the desired speed to generate an error signal;

generating a correction signal related to said error signal and multiplying said correction signal by a variable gain value;

providing said variable gain value with a variable amplitude generated as a linear function of said error signal, said variable amplitude being a first linear function of said error signal when said error signal is less than a predetermined amplitude and a second linear function of said error signal when said error signal exceeds said predetermined amplitude, said second linear function being different from said first linear function; and actuating the engine throttle in relation to said multiplication of said correction signal times said variable gain value.

7. The speed control method recited in claim 6 wherein said gain providing step provides said second linear function with greater sensitivity to said error signal than said first linear function.

* * * * *